May 31, 1960     H. FEHR     2,939,023
SYNCHRONOUS HOMOPOLAR MAGNETIC CLUTCH
Filed Nov. 23, 1954     9 Sheets-Sheet 1

May 31, 1960 H. FEHR 2,939,023
SYNCHRONOUS HOMOPOLAR MAGNETIC CLUTCH
Filed Nov. 23, 1954 9 Sheets-Sheet 6

May 31, 1960 H. FEHR 2,939,023
SYNCHRONOUS HOMOPOLAR MAGNETIC CLUTCH
Filed Nov. 23, 1954 9 Sheets-Sheet 8

United States Patent Office 2,939,023
Patented May 31, 1960

2,939,023

SYNCHRONOUS HOMOPOLAR MAGNETIC CLUTCH

Henri Fehr, Montmorency, France, assignor to Societe Anonyme dite: Compagnie de Construction Mecanique Procedes Sulzer, Paris, France Filed Nov. 23, 1954, Ser. No. 470,756

Claims priority, application France Nov. 24, 1953

6 Claims. (Cl. 310—105)

This invention relates to a homopolar magnetic clutch mechanism comprising essentially a stationary annular field winding and a pair of coaxial and adjacent annular rotors, one rotor being driven in rotation and constituting a rotating inductor, whilst the other rotor is a free rotating armature, both rotors having formed thereon teeth acting as magnetic poles the mutual attraction forces of which combine to produce a synchronous torque.

The teeth of one or both rotors are covered with or surrounded by highly-conductive non-magnetic metal so that the magnetic flux flowing across each tooth is surrounded by conducting winding wherein as the asynchronous drive occurs induced currents producing a synchronizing torque are developed due to the periodic variations in the magnetic flux which are caused by the relative movement of the two rotors. The metal employed for coating or covering the teeth serves at the same time as a support to magnetic parts.

When one rotor is previously rotating and one switches on the energizing current, the other rotor is progressively driven for rotation like the rotor of a homopolar asynchronous motor.

For given dimensions, the torque transmitted is only a function of the value of the energizing current and the coupling operates as a synchronized asynchronous motor.

The stationary field magnet is preferably of the toroidal field type carrying the energizing coil and the feeding conductors.

The rotors serve the reversible functions of movable inductor and armature; for example, they consist of massive mild-steel members, or relatively thick steel-plate stackings secured radially on a disc to form a pair of toothed flanges.

The teeth are surrounded completely, and the space between the flanges is filled with a non magnetic conductive metal, for example cast aluminum alloy, this element corresponding to a massive squirrel-cage of an asynchronous motor.

The inner and outer coaxial rotors have the same—even or odd—number of teeth.

A plane-gap arrangement may be employed; thus, the races of the thrust bearing mounted between the two rotors for withstanding the magnetic attraction are in relative motion only during the starting period, i.e. during the asynchronous operation of the coupling.

If it is desired to exert on a rotating shaft a progressively increasing braking force until the shaft is completely still, a single-rotor magnetic coupling may be used. In this case the apparatus will comprise the stationary toroidal inductor supporting and screening the energizing coil but having pole plates provided with teeth covered with a non-magnetic highly conducting metal and a coaxial rotor having the function of an armature provided at either end with flanges, at least one of these flanges being formed with teeth and covered with a conductive non-magnetic metal, this last-mentioned rotor being bound in rotation with the shaft to be braked.

The attached drawings forming part of this specification illustrate diagrammatically, by way of example, a few forms of embodiment of the invention. In the drawings.

Figure 1:
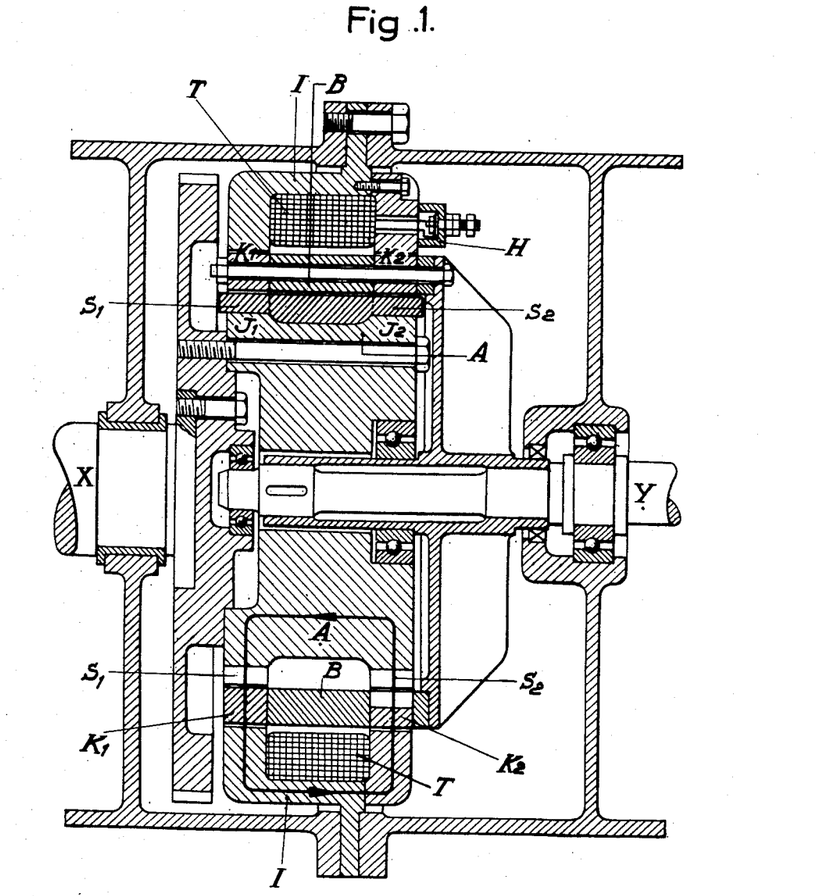
Figure 1 illustrates in axial section a clutch having two cylindrical active gaps.
Figure 2:
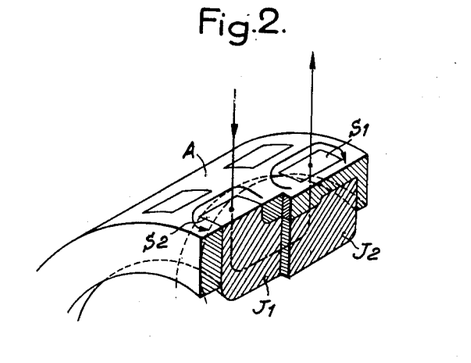
Figure 2 is a diagrammatical sectional view of the inner rotor.
Figure 3:
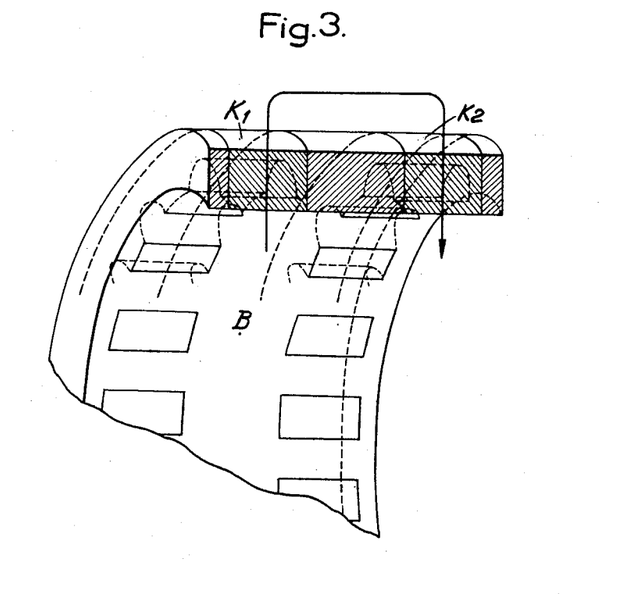
Figure 3 is a similar view of the outer rotor.

The synchronous homopolar clutch shown in Figs. 1, 2 and 3 consists of a stationary toroidal inductor I carrying the energizing coil T and the feeding conductors H thereof.

A pair of rotors A and B, having the reversible functions of rotating inductor and armature, respectively, are mounted co-axially to the stationary inductor I.

The rotor A may consist either of a massive or solid mild-steel member or of relatively thick sheet-metal elements or stackings welded radially on a disc; this rotor is bound in rotation with the driving shaft X and formed at either end with flanges $J_1$, $J_2$ having annular sets of peripheral teeth $S_1$, $S_2$ respectively.

The teeth $S_1$, $S_2$ are surrounded completely by, and the space between the flanges is filled with a non-magnetic but highly-conductive metal such as cast aluminum alloy, so as to correspond to the massive squirrel-cage of an asynchronous motor (Fig. 2).

The rotor B rigid with the driven shaft Y consists of a pair of toroidal mild-steel elements $K_1$ and $K_2$, one at least of these elements being toothed internally; the teeth are surrounded by, and the space therebetween is filled with, non-magnetic metal (B, Fig. 3).

The inner and outer rotors have the same number of teeth, even or odd. In the arrangement shown in Fig. 1, to illustrate the principle of the invention the element $K_2$ alone is formed with a set of teeth, whilst the other element $K_1$ has a continuous surface swept continuously by the teeth $S_1$; besides, this element $K_1$ when a relative movement occurs between the rotors A and B, becomes the seat of strong eddy-currents the reaction couple of which increases the asynchronous torque while exerting a damping action.

Assuming that one rotor, for example B, is previously rotating, when energizing current is fed to the apparatus, the other rotor A will firstly be driven progressively as in the case of an asynchronous motor, due to the creation on the one hand of induced currents in the squirrel-cages, and on the other hand of eddy-currents in the whole mass of metal elements, these currents developing forces which counteract the forces which developed them. The secondary rotor speed will thus increase progressively and finally the synchronization takes place.

From this moment on the two rotors rotate at the same velocity and the teeth are no more swept, whilst the field and eddy currents are of zero value, whereby the internal losses of energy are also zero and the torque transmitted will thus depend only on the value of the energizing current for given constructional dimensions.

Then, the coupling will operate as a synchronous motor.

Since the energizing power required is low, the general efficiency is relatively high, provided that gaps are minimized, that is to say of the same order as those of conventional asynchronous motors.

Another arrangement (Fig. 4) of the multi-stage type enables the transmitted torque to be increased to a substantial extent for given over-all dimensions.

Figure 4:
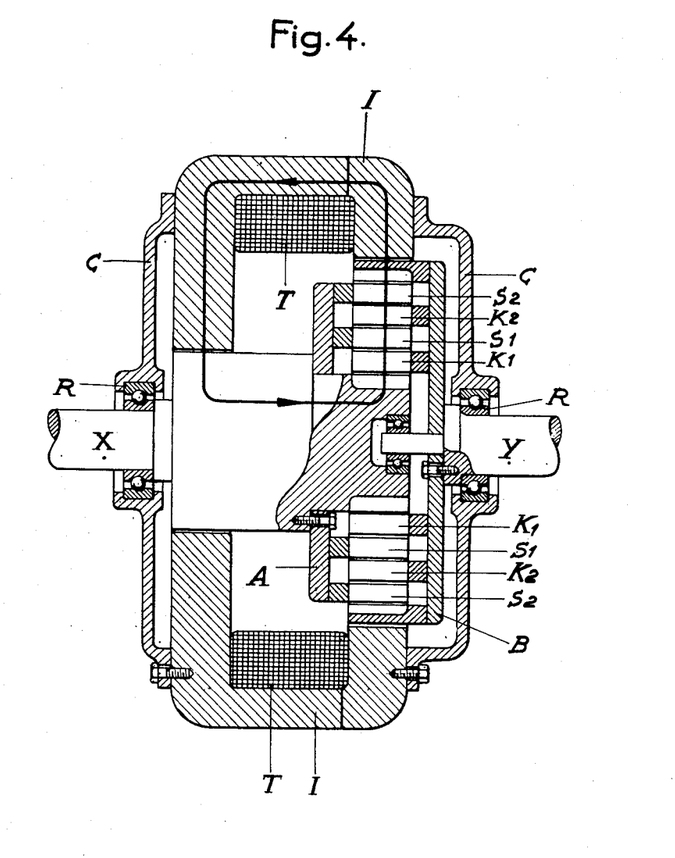
Figure 4 shows in axial section a multi-stage clutch.

In this embodiment the stationary inductor I rigid with a cage C is arranged ringwise around two rotors A, B mounted on bearings R in this cage and rigid with the driving and driven shafts X, Y respectively; the sets of teeth $S_1$ and $S_2$ of rotor A are radially imbricated in the teeth $K_1$ and $K_2$ of B, thereby producing a staggered mutual penetration of the two solid sets of teeth of the rotors; thus, for example, the ends of rotor B are provided with half-teeth.

Figure 5:
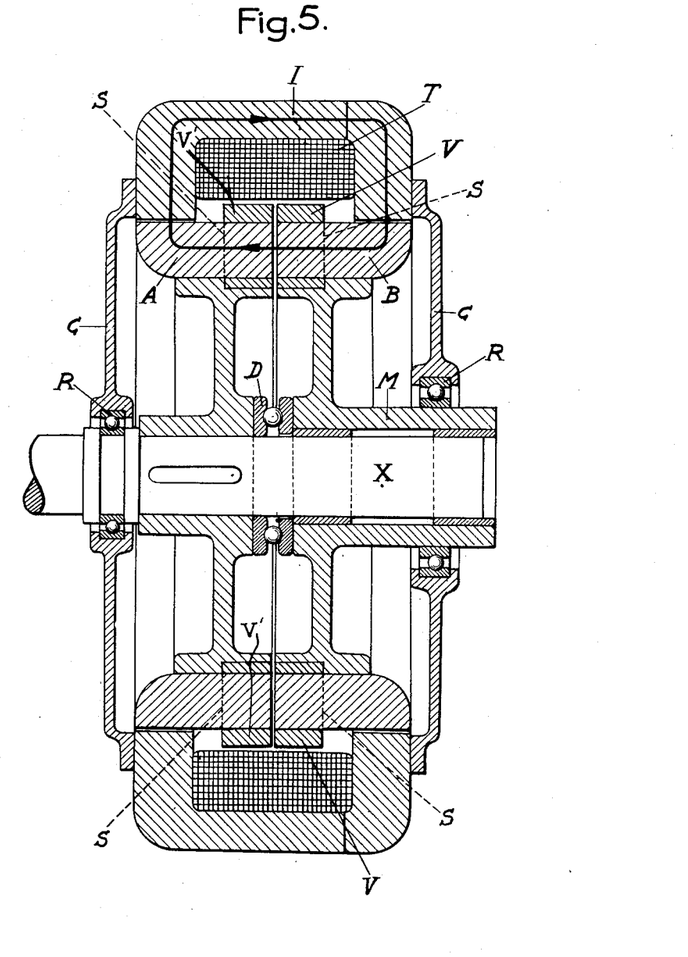
Figures 5, 6, 7 and 8 are axial sections showing four different embodiments of the magnetic clutch according to this invention.

In Fig. 5, the apparatus illustrated comprises a stationary annular inductor I having a toroidal winding T; this inductor is for example carried laterally by a pair of stationary end flanges C mounted through suitable bearings R to one side on the driving shaft X and to the other side on a driven sleeve or tubular shaft M mounted for smooth frictional engagement on the shaft X.

A pair of concentrical adjacent rotors A, B, formed with sets of teeth S act, the former as a rotating inductor and the other as a rotating armature; the functions of these rotors are reversed; thus, rotor A is wedged or keyed on the driving shaft X, and rotor B is wedged or keyed on the tubular shaft M. The sets of teeth S contribute in producing an asynchronous starting torque and a synchronous synchronizing torque.

A ball thrust bearing D is provided between the rotors A and B.

V and V' designate the metal surrounding the teeth of the rotors A and B.

Figure 6:
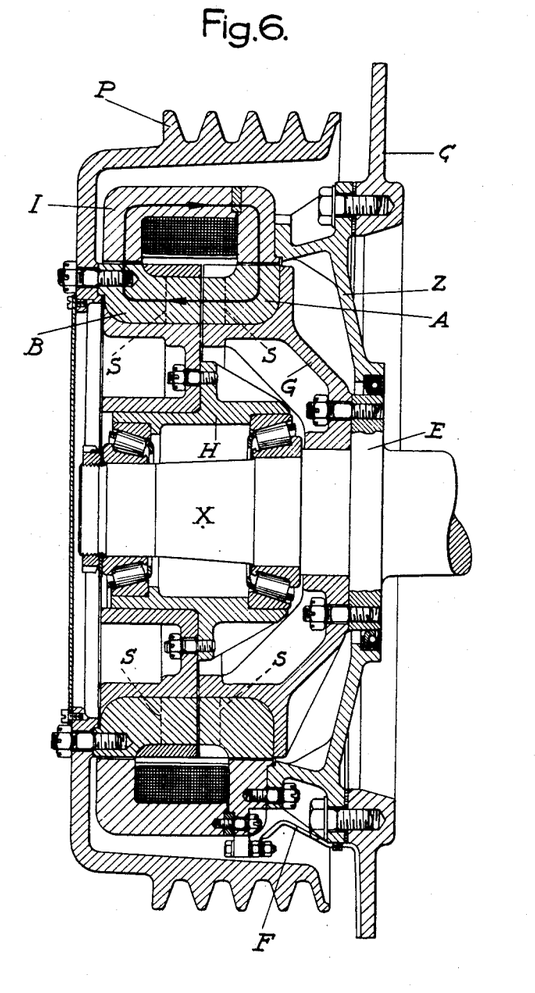

This fully screened arrangement is particularly economical and may be constructed in the manner shown in Fig. 6.

The annular stationary inductor I is bolted on the supporting flange Z secured on the case C; the wires supplying the energizing current to the field windings are designated by the reference letter F.

The movable inductor A provided with teeth S is carried by radial arms G bolted on a shoulder E formed on the driving shaft X driven in turn from an engine (not shown).

The other rotating inductor B formed with a set of teeth S is bolted on the ball-bearing case H supported by the shaft E. This inductor is bolted on the pulley P surrounding the assembly described hereinabove.

As in the case illustrated in Fig. 5, the magnetic flux lines are completed as indicated by the arrowheads in the inductor I and rotors A, B across a plane gap and a pair of cylindrical gaps.

A similar arrangement may be designed with cylindrical gaps alone.

Figure 7:
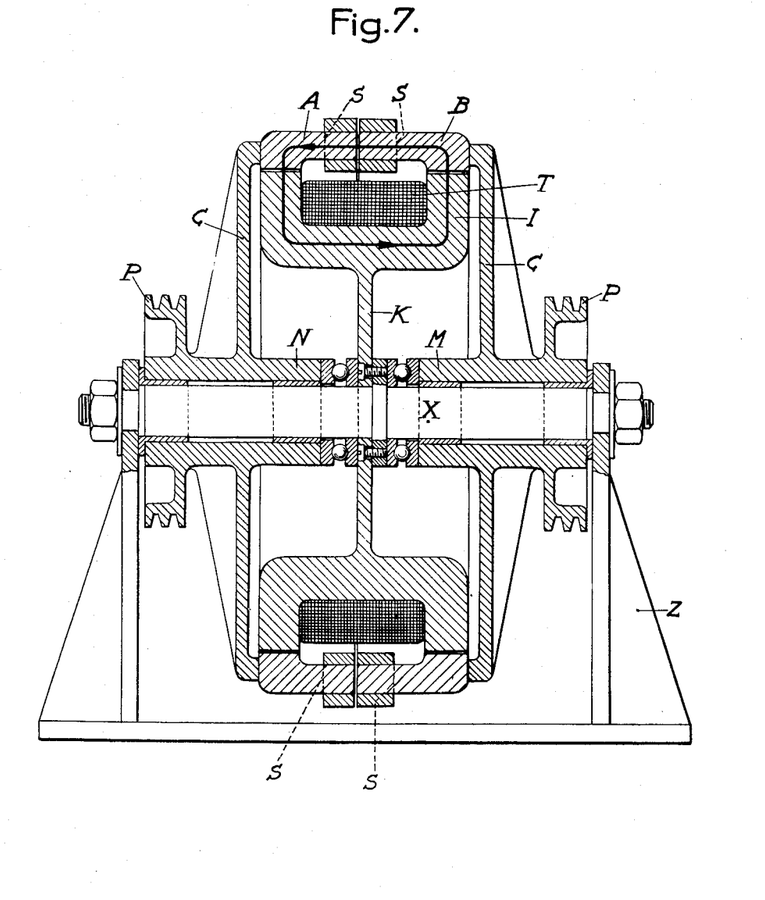

In Fig. 7 the stationary inductor I having toroidal windings T is carried by a disc K rigid with the stationary shaft X carried in turn by the frame structure Z; on this shaft X are rotatably supported through suitable bearings a pair of sleeves M, N fast with lateral flanges C carrying the one the rotor A and the other the rotor B, as well as a pair of end pulleys or pinions P, one for driving the coupling and the other for driving a machine, such as a machine tool, controlled through the coupling.

The covered teeth S may in this case be arranged ringwise on the rotors A and B.

Figure 8:
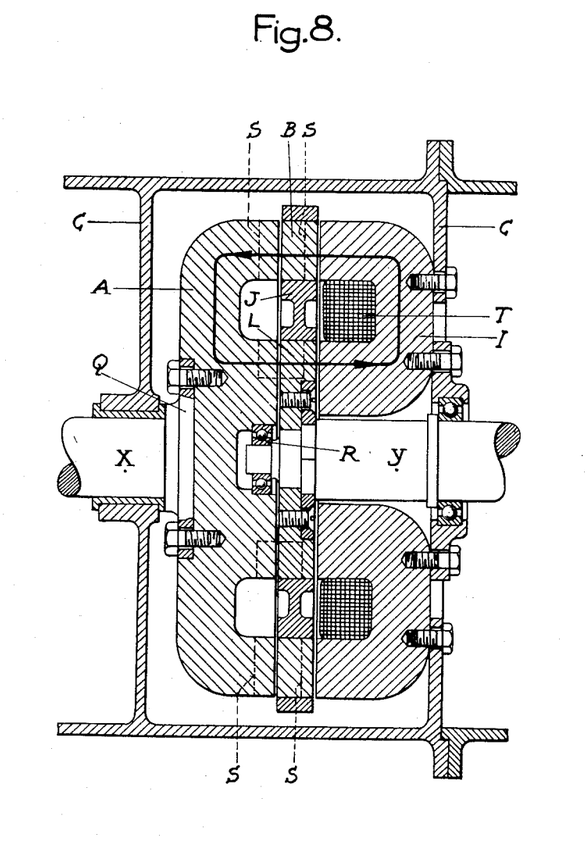

Fig. 8 shows diagrammatically another possible embodiment comprising four plane gaps. The stationary annular inductor I having a toroidal winding T is mounted in a surrounding case C by means of bolts. The movable inductor A formed with teeth S is bolted in turn on the flange Q rigid with the driving shaft X.

The armature B formed with metal-coated teeth S is carried by a non-magnetic intermediate flange J secured on a ferrous hub L rigid with the driven shaft Y centred through bearings R in recesses provided for this purpose in the inductors.

Figures 9, 10, 11:
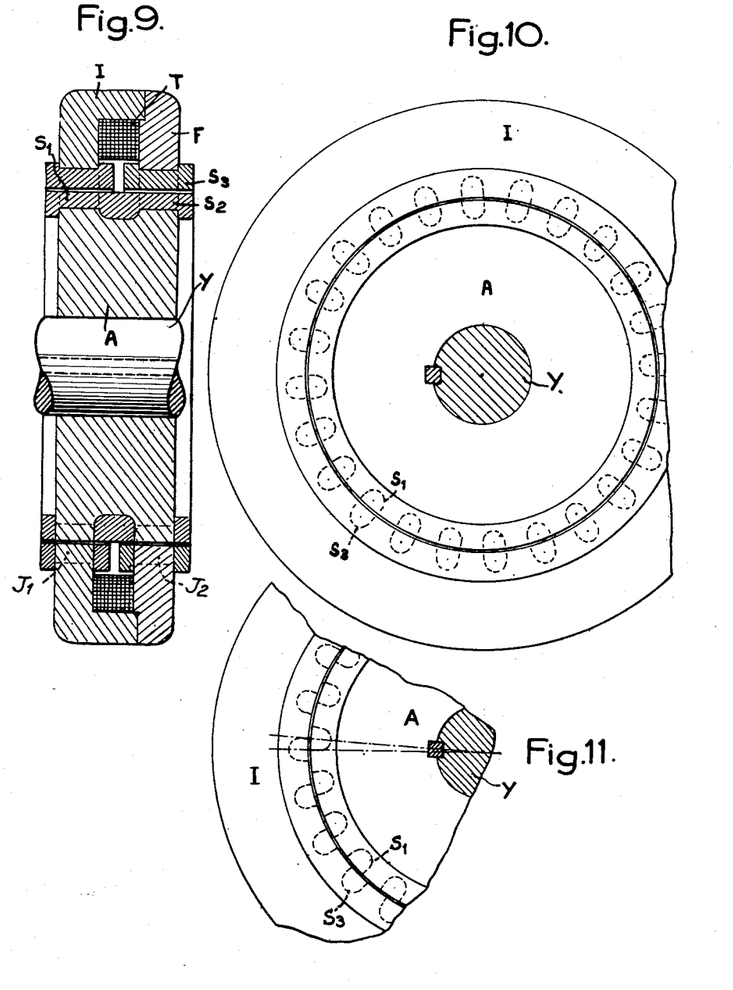
Figure 9 is an axial section showing a magnetic brake made as a mere application of this invention.
Figures 10 and 11 are fragmentary end views of the apparatus of Fig. 9, given for explanatory purposes.

The magnetic lines of flux are completed as indicated by the arrowheads. This arrangement may also be used as a magnetic brake. In fact, when it is desired to exert a progressively increasing retarding or braking force on a rotating shaft until the latter is completely still, a single-rotor magnetic clutch may be used. In this case, the apparatus will comprise (see Fig. 9):

(1) The stationary toroidal inductor I serving as a supporting and screening member to the energizing coils T, but having its pole flanges F formed with teeth $S_3$ surrounded by a highly-conductive, non-magnetic metal (squirrel cage);

(2) A massive mild-steel co-axial armature rotor A formed at either end with a flange (rotor A of the clutch), both flanges being provided with teeth $S_1$, $S_2$ (a single set of teeth may be provided in certain cases), this rotor being rigid with the shaft Y to be braked (the stator and rotor having the same number of teeth, whether even or odd). The spaces $J_1$, $J_2$ formed on the one hand between the teeth and on the other hand between the flanges are filled with a highly-conductive, non-magnetic metal such as cast aluminum alloy, to constitute an assembly similar to a massive squirrel-cage of an asynchronous motor.

Assuming that the armature is previously rotating from the very moment the field coils are energized, the sweeping of the toothed surfaces of the stationary inductor and rotating armature creates induced currents in the squirrel cages, on the one hand, and eddy currents in the assembly of metal masses, on the other hand, these currents counteracting the forces from which they are produced.

As a result, a progressively increasing braking torque develops which is similar to the starting torque of the homopolar clutches, this torque being proportional to the rotor speed and to the strength of the energizing current, for given constructional dimensions.

Due to the action exerted by this braking torque the rotor speed is reduced and finally becomes zero due to a synchronization similar to that produced in the clutches (see Fig. 10).

At this time, the apparatus provides a magnetic braking—with the rotor held against movement—in contradistinction with eddy-current magnetic brakes of conventional design, wherein the braking action occurs only if a relative movement takes place.

From this moment on, the angular displacement between the opposite teeth sets of the stationary inductor on the one hand and the armature on the other hand is a function of the torque applied to the armature shaft (see Fig. 11).

This angular displacement—from which the torque may be measured—may then be used for actuating any desired device or member, notably electrically-controlled relay means.

Figure 12:
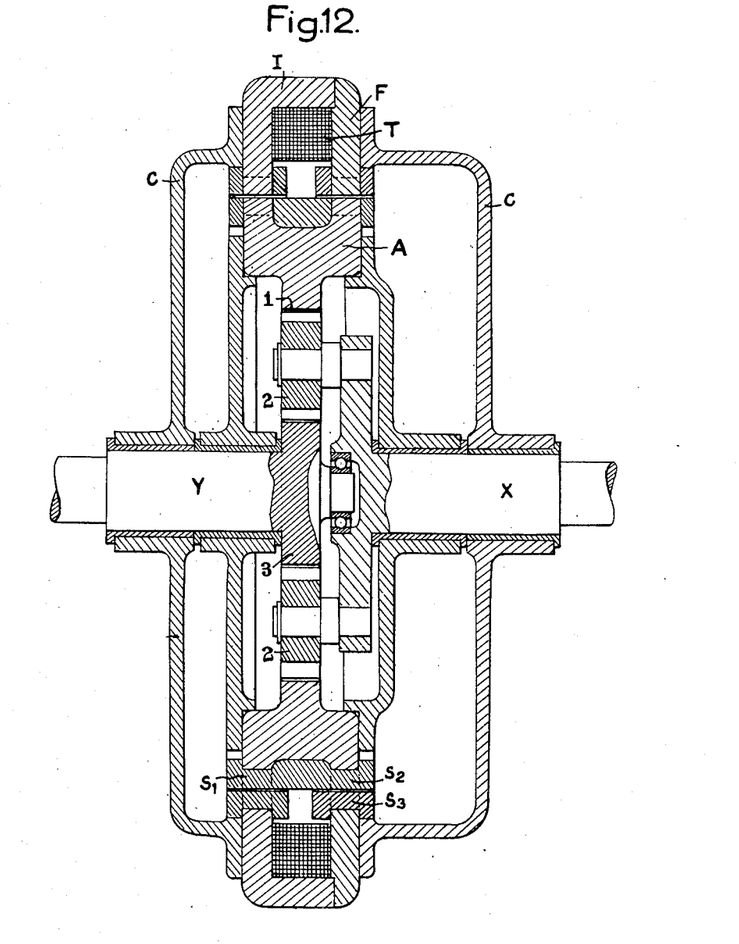
Figure 12 shows in axial section the application of the principle of this invention to the driving of an epicyclic step-down or step-up gear with clutch action.

Figure 12 illustrates a specific application of the principles of this invention to a reducing gear associated with a coupling or clutch. In this arrangement the movable or rotating armature A is bound with the outer annulus 1 of an epicyclic gear comprising in addition a set of planet pinions 2 and a sun wheel 3; with this apparatus it is possible, assuming that the driving shaft X is rotating, to progressively accelerate the velocity of rotation of the output or driven shaft Y, the reducing ratio being dependent on the constructional dimensions of the epicyclic gear components; on the other hand, the torque transmitted is constantly a function of the energizing current fed to the apparatus. The maximum torque corresponds to the synchronous synchronizing torque. The rotating armature A may be secured to the sun wheel 3 or alternately to the planet carrier rigid with the driving shaft X.

The advantageous features characterizing these apparatus may be summarized as follows:

(a) The rotating parts are massive, simple and extremely sturdy;

(b) A closed, completely screened or sealed assembly may be constructed;

(c) Obviously, stationary windings are less liable to damage and failure than rotating windings; besides, toroidal windings are easier to manufacture;

(d) Any sliding contacts, slip rings and brushes are completely dispensed with;

(e) When the apparatus has attained its synchronous condition no friction occurs;

(f) Over-all dimensions and weight are kept to minimum values due to the relatively high values of the synchronous torques developed;

(g) Low inertia of rotating parts;

(h) It is possible to adjust the clutch progressiveness and the limit torque by varying the energizing current;

(i) The drive begins immediately upon the supply of energizing current to the field windings;

(j) A resilient magnetic coupling is obtained (without adherence between the two rotors—no torsional vibration is transmitted.

Of course, the embodiments shown diagrammatically in the attached drawings and described hereinabove are given solely for illustrative purposes, it being understood by anybody conversant with the art that many modifications may be brought thereto without departing from the spirit and scope of the invention as set forth in the appended claims.

What I claim is:

1. A synchronous homopolar magnetic clutch comprising a stationary annular toroidal inductor having a U-shaped cross-section, an energizing winding located in said U-shaped cross-section of said inductor, a first annular massive rotor formed at either end with flanges, teeth at the periphery of said flanges, non-magnetic and highly conductive metal surrounding completely said teeth and filling the space between the flanges, another rotor coaxial with the outer periphery of said first rotor and comprising a pair of internally toothed steel toroidal elements, a distance member of non-magnetic metal filling the cavities between the teeth of said other rotor, a shaft rigid with said first rotor, another shaft rigid with said other rotor, both rotors having the same number of teeth.

2. A synchronous homopolar magnetic clutch comprising a stationary annular toroidal inductor having a recess therein, an energizing winding located in said recess of said inductor, a first annular massive rotor, elements of non-magnetic, highly conductive metal disposed on the operative face of said rotor, teeth surrounded by said elements, a second rotor coaxial to the operative face of said first rotor and comprising a pair of toothed steel toroidal elements, a distance member of non-magnetic metal filling the cavities between the teeth of said second rotor, a shaft rigid with said first rotor, a second shaft rigid with said second rotor, both rotors having the same number of teeth.

3. Slipless homopolar electromagnetic clutch with gradual driving and synchronization under load for connecting a driving shaft to a driven shaft, which consists of a stationary annular field member of ferromagnetic metal which has a toroidal winding disposed in the transverse plane of symmetry of the clutch and two adjacent rotors of revolution made of ferromagnetic metal, these rotors having teeth and forming the one a field member solid with said driving member and the other an armature solid with said driven member, the teeth of said two rotors having a continuous coating of conducting metal around each tooth surrounding its magnetic flux and forming on the other hand a turn surrounding the complete magnetic circuit assembly.

4. A synchronous homopolar magnetic clutch comprising a stationary annular toroidal inductor having a U-shaped cross-section, an energizing winding carried by said inductor, a first annular rotor arranged centrally of said inductor and formed at either end with flanges, teeth at the periphery of said flanges, non-magnetic and highly conductive metal surrounding completely said teeth and filling the space between the flanges, another rotor coaxial with the first rotor and arranged between said first rotor and said inductor with reduced circular gaps, said other rotor being formed by a pair of internally toothed adjacent toroidal elements, both rotors having the same number of teeth, a distance member of non-magnetic metal filling the cavities between adjacent teeth and surrounding the latter completely, driving and driven shafts rigid with each of said rotors respectively, and means for varying the value of the energizing current.

5. An electromagnetic clutch according to claim 3, in which said rotors are annular and in which one of said rotors surrounds one portion of said annular field member and the other of said rotors surrounds another portion of said annular field member.

6. An electromagnetic clutch according to claim 3, in which said rotors are disposed in axial alignment with one another and in which the teeth of said rotors are disposed at the peripheries of the rotors and face in an axial direction, the teeth of one rotor facing the teeth of the other rotor.

References Cited in the file of this patent

UNITED STATES PATENTS

| | | |
|---|---|---|
| 1,633,454 | Mills | June 21, 1927 |
| 2,071,943 | Fraser | Feb. 23, 1937 |
| 2,488,827 | Pensabene | Nov. 22, 1949 |